United States Patent [19]

Fiks

[11] Patent Number: 4,936,120
[45] Date of Patent: Jun. 26, 1990

[54] ANTI-THEFT DEVICE FOR MOTOR VEHICLES

[76] Inventor: David Fiks, P.O. Box 6351, Haifa, Israel, 31062

[21] Appl. No.: 336,715

[22] Filed: Apr. 12, 1989

[30] Foreign Application Priority Data

Jul. 2, 1987 [IL]  Israel ........................................ 83061

[51] Int. Cl.⁵ .............................................. E05B 65/12
[52] U.S. Cl. ........................................ 70/202; 70/238; 70/247
[58] Field of Search ....................... 70/14, 18, 237–239, 70/202, 203, 211–213, 247, 254

[56] References Cited

U.S. PATENT DOCUMENTS

| 4,015,455 | 4/1977 | Leverton | 70/202 X |
| 4,708,005 | 11/1987 | Bernacchi | 70/202 X |
| 4,835,999 | 6/1989 | Chant | 70/247 X |

FOREIGN PATENT DOCUMENTS

| 3238005 | 4/1984 | Fed. Rep. of Germany. | |
| 652858 | 2/1963 | Italy | 70/237 |
| 86/1816 | 3/1986 | South Africa. | |
| 2142889 | 1/1985 | United Kingdom | 70/247 |
| 2145679A | 4/1985 | United Kingdom. | |

Primary Examiner—Lloyd A. Gall
Attorney, Agent, or Firm—Frishauf, Holtz, Goodman & Woodward

[57] ABSTRACT

An anti-theft device for motor vehicles of the kind having a gearshift lever and a handbrake lever mounted on the floor in line with each other, consists of a tubular member open at its bottom which is to be fitted over the handbrake lever, and a bi-furcated member which is to be pressed onto the gearshift lever. The bi-furcated member includes two bars which are slidingly fastened in two bores at the ends of an axle which is rotatably mounted in the upper end of the tubular member and which can be locked in any position by a tooth pushed upwards by a lock in the tubular member by entering a space between two teeth of a gear on the axle. The two bars are recessed by grooves in their sides facing each other which can be engaged by two coaxial pins in the axle, which are pressed into a pair of grooves by the same lock and can be pushed inwardly of the axle after unlocking.

7 Claims, 6 Drawing Sheets

ANTI-THEFT DEVICE FOR MOTOR VEHICLES

BACKGROUND OF THE INVENTION

The invention relates to an anti-theft device for a motor vehicle of the kind having a floor-mounted gearshift lever and a handbrake lever generally in line with one another.

Most modern cars are provided with a steering lock which is destined to prevent unauthorized operation of the motor vehicle. It is opened by turning the ignition key, but it is has proved an insufficient protection against theft, since a thief can easily break the tongue of the steering lock by vehement turning of the steering wheel, which allows him driving the vehicle away, after having started the ignition cycle.

An improved anti-theft device comprises means for locking the gear lever in a fixed position to the car body, thereby preventing gear-shifting, but not preventing the thief from releasing the hand brake and towing the car away on the two non-driven wheels. In order to prevent this kind of car theft devices have been disclosed which will lock both the gearshift lever and the handbrake lever in a fixed position, and such devices have been disclosed, among others, in the following three patents:

A device according to British Patent No. 2,145,679 comprises a tube which fits over the handbrake lever and a bar angularly welded to the closed end of the tube. The bar is perforated by a number of holes permitting a padlock to be threaded through one or two of these holes, while encircling the gearshift lever and thus preventing movement of both levers.

A similar anti-theft device is disclosed in the South-African Patent No. 861816. It is in the shape of a tube open at its one end and flattened at its other end, the flattened end being perforated by a number of holes serving for the attachment of a U-shaped bracket and a padlock. For securing the car, the open end of the tube is fitted over the handbrake lever, and the other end locked to the gearshift lever, thus immobilizing both levers, as in the aforementioned British Patent.

The German Patent Publication No. 3238005 describes a device consisting of a vertical box which has an open bottom and can be slipped over the gearshift lever, and of a second box obliquely extending from the side wall of the vertical box serving to receive the handbrake lever. A lock is provided in the vertical box which engages the knob of the gearshift lever and thus prevents removal of the device from enegagement with the two levers.

All the aforementioned locking devices are cumbersome and do not give the desired protection, since they can be opened by a skilled mechanic without damage to the motor vehicle parts.

Another drawback of the aforementioned devices is that both levers, or at least one lever, have to be placed at a certain angle, so as to allow the locking device to be fitted over both levers. This means that either the gearshift lever cannot be placed in the parking position or the handbrake lever cannot be fully drawn back.

It is, therefore, the object of the present invention to provide a simple device which can be easily fitted and readily locked, and can be likewise opened and removed.

It is another object to permit the device to be fitted over both the gearshift and the handbrake lever, when these are in their respective parking and braking position without the need of adjusting their position to the size and shape of the locking device.

It is a still another object of the invention to provide a safety device which is hard to open and to remove by a potential thief and will, therefore, deter him from trying to steal the car.

And it is a final object to provide such device at low cost in order to enable each car owner to install it.

SUMMARY OF THE INVENTION.

The car-locking device of the present invention is characterized by the feature that both the gearshift lever and the handbrake lever can be placed in any position before locking takes place, and that they cannot be moved out of this position as long as the device is in place. The device comprises a tube adapted to be fitted over the handbrake lever and a bifurcated member which is attached to the upper end of the tube and is provided at its far end with a stop engaging the gearshift lever in its foremost position. In this position the gearshift lever, in both automatic as well as in manual shifting arrangements, blocks the car engine, and does not allow towing of the vehicle, the more since the handbrake blocks the other pair of wheels. In order to fasten the device to the two levers of any car make and in any position the driver wants to fix the levers, the bifurcated member is attached to the upper end of the tube by means of a hollow axle which, in unlocked state, permits both longitudinal shifting and angular disposition of the member in respect of the tube. As soon as the device engages both levers, while thrusting them apart, the device is locked by either a cylinder- or a number-lock, and remains in rigid position until it is unlocked again.

The bifurcated member comprises two parallel bars which are rigidly interconnected by at least one cross member and are slidingly positioned in two parallel bores at the two ends of the hollow axle. Both bars are recessed by several recesses along the sides facing the tube and are held in position by any of the recesses engaging two plungers adapted to be outwardly urged in the bore of the axle and fixed in recess-engaging position. The axle is rotatably positioned in a transverse bore in the top end of the tube and is provided with teeth on its circumferential central portion. A piston-shaped body is slidingly positioned inside the tube and is provided with a tooth adapted to engage with one of the teeth on the axle and to be locked in this position by locking means. The piston is additionally provided with projections which secure the two plungers inside the axle bore in the recesses in the two bars, whereby the bifurcated member is held in both longitudinal and angular fixed position. The piston is urged towards the axle by hand with the aid of an external ring connected to the piston assisted by a spring means which is sufficiently weak to allow turning of the bifurcated member and the axle from tooth to tooth. The device is locked by either a cylinder-lock of known design or by a number-lock in the form of at least one ring rotatable about the tube and permitting shifting of the piston in only one position of the ring. In order to provide additional safety, two or three rings are fitted, each containing numerals on its circumference, whereby the combination of three numerals permits the tooth of the piston to be pushed out of engagement with the teeth on the axle and the two plungers to be withdrawn out of the recesses in the two bars.

SHORT DESCRIPTION OF THE DRAWINGS.

FIG. 1 is a side view of the locking device engaging both a gearshift lever and a handbrake lever of a car,
FIG. 2 is a top view of the device shown in FIG. 1,
FIG. 3 is a section through the locking device along the line 3—3 of FIG. 1,
FIG. 4 is a section along line 4—4 of FIG. 3,
FIG. 5 is a side view of the locking device similar to that illustrated in FIG. 1, but provided with a cylinder lock,
FIG. 6 is a top view of the device shown in FIG. 5,
FIG. 7 is a section through the locking device shown in FIG. 6 along the line 7—7, and
FIG. 8 is a section along line 8—8 of FIG. 7.

DETAILED DESCRIPTION OF THE DRAWINGS.

Figure 1:
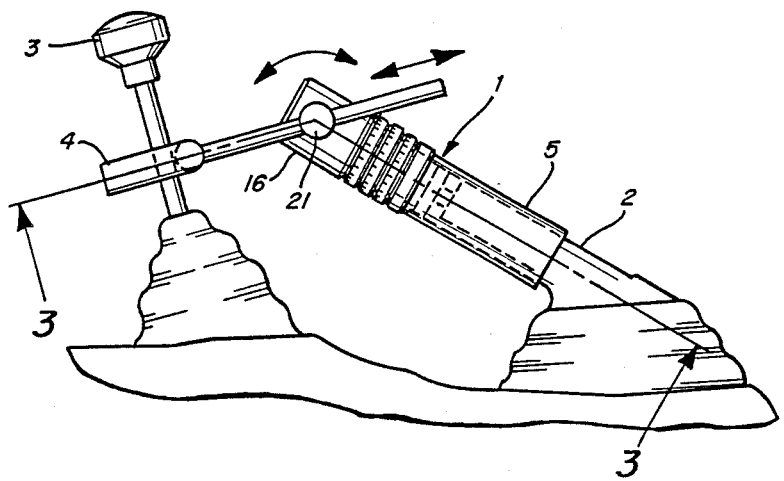
Figure 2:
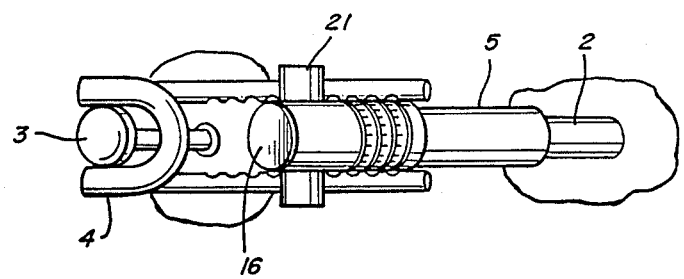
Figure 3:
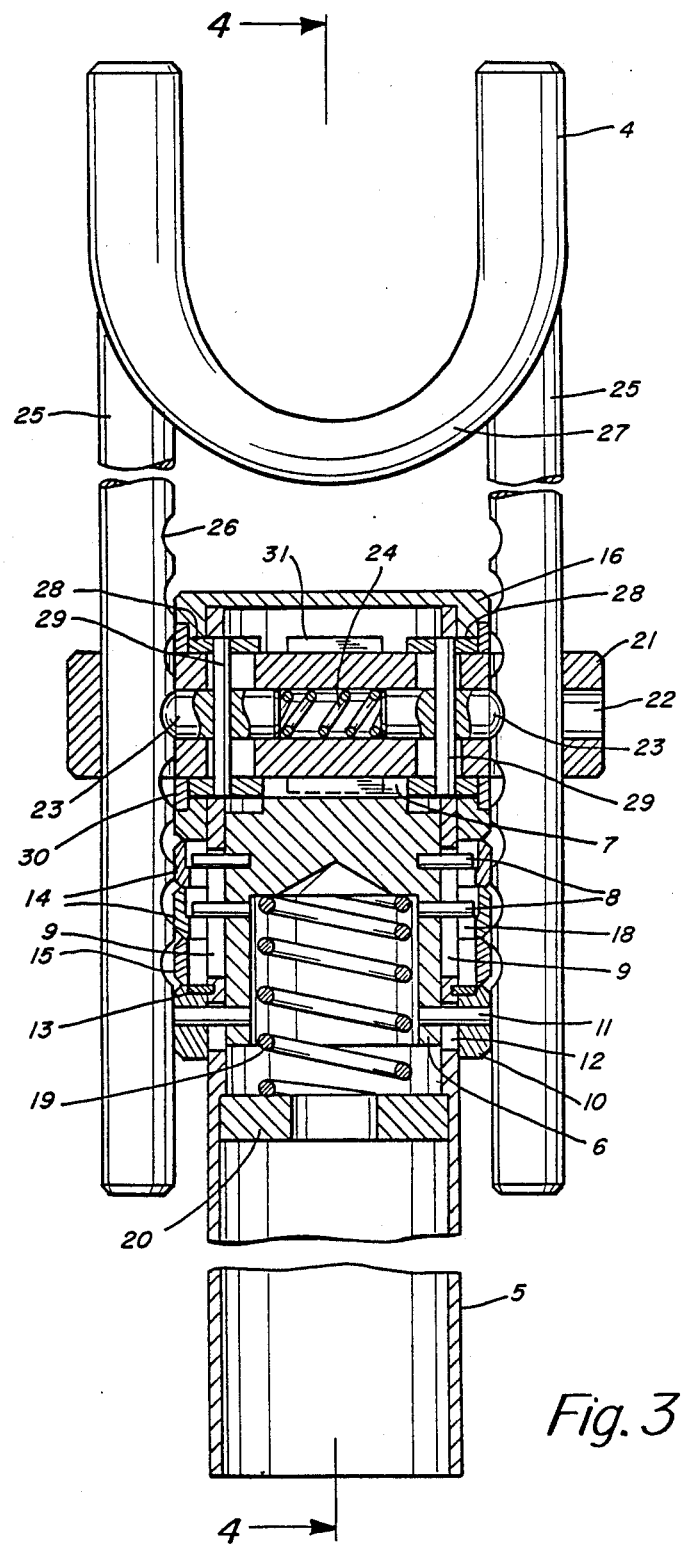
Figure 4:
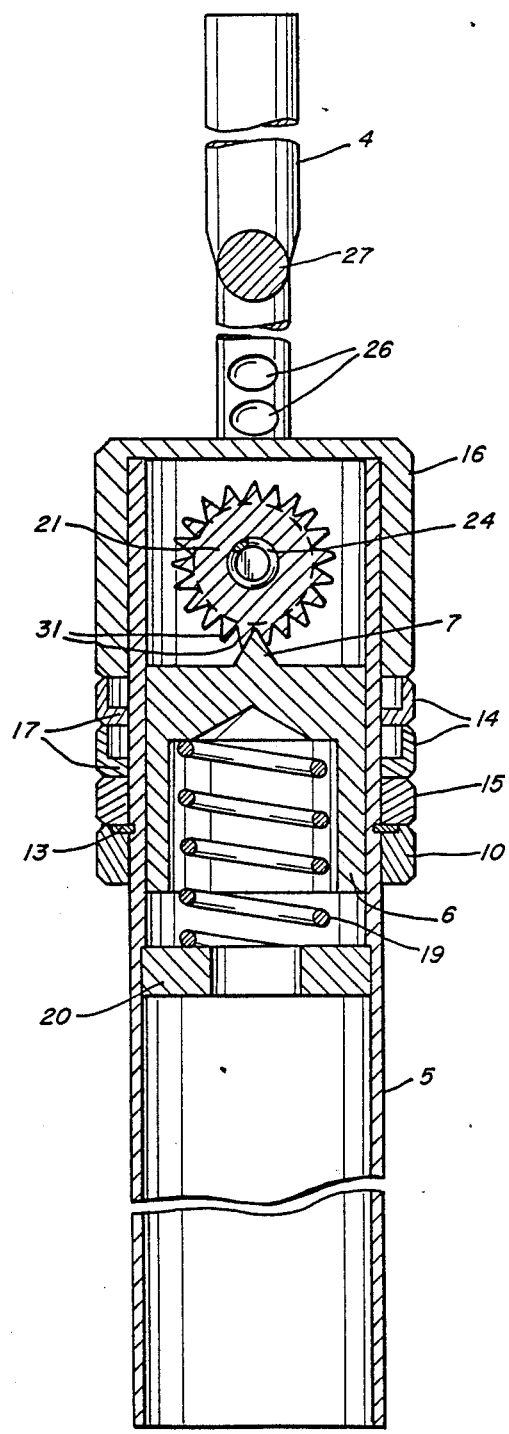
Figure 5:
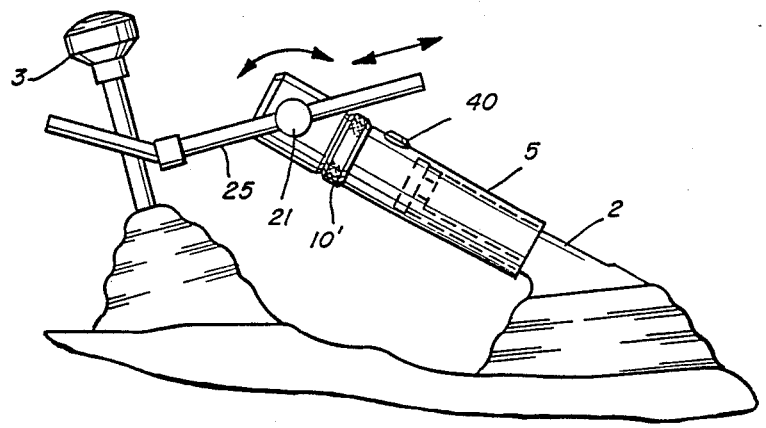
Figure 6:
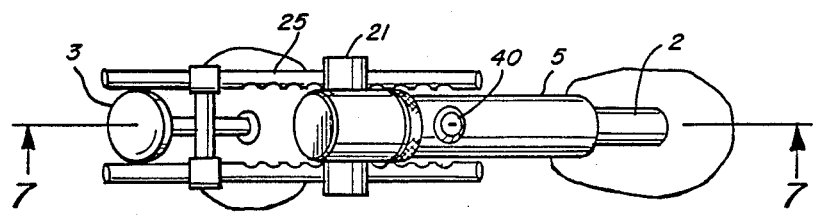

The locking device 1 is shown in gear-locking position in FIGS. 1 and 2, wherein the handbrake lever 2 is covered by the tube 5 and the gearshift lever 3 is held and urged in forward direction by the forked end of the bifurcated member 4. FIGS. 3 and 4 show the locking mechanism in detail; herein the upper end of a tube 5 is covered by a cup-shaped cover 16, both being transversed by a horizontal axle 21 which is rotatably mounted in two discs 30. The axle contains two plungers 23 movable in a concentric bore 22 and two bars 25 of the bifurcated member which are movably held in two transverse bores at the two ends of the axle. The two bars are rigidly interconnected by a U-shaped cross member 27 and are on their opposing faces provided with several recesses 26, adapted to engage with the ends of the plungers 23. The plungers are urged into each pair of recesses 26 by a helical spring 24 mounted in the bore 22 between the two plungers, which is sufficiently weak to permit shifting of the bars from one recess to the other, while adjusting the length of the member into engagement with the gearshift lever. The central, circumferential portion of the axle 21 is furthermore provided with integral, outstanding teeth 31 rotatable together with the axle. Two transverse pins 29 are firmly located in bores of the plungers 23 and are movable along the axle 21 in two slots extending lengthwise and parallel to the two bars 25; the pins connect the plungers to two flat rings 28 which are slidingly movable along the axle 21, together with the plungers.

Locking of the bars in angular and longitudinal alignment in respect to the tube 5 is essentially carried out by upwardly motion of a piston 6 in the smooth bore of the tube 5, whereby a tooth 7 at the top of the piston engages with one of the teeth 31 and prevents rotation of the axle 21; the width of the tooth 7 is coextensive with the space between the two rings 28 to define shoulders while they are holding the plungers in their recess-engaging position and in this position of the piston the plungers are thus prevented from being pressed out of the recesses 26 in the bars 25. The piston 6 is normally urged towards the axle 21 by a helical spring 19 which is supported by an annular base 20 firmly connected to the inside of the tube as well as by manual shifting of a ring 10 which is longitudinally movable along the outside of the tube 5. The ring 10 is rigidly connected to the piston 6 by means of two pins 11 which extend through lengthwise extending slots 12 in the tube wall. The spring is designed to permit downward movement of the piston as long as it is not locked inside the tube, thereby allowing adjustment of the bifurcated lever in both angular and lengthwise alignment by rotation of the axle and lengthwise shifting of the bars 25. As soon as the correct position is reached the piston is locked by rotation of three rings 14 and 15 on the outside of the tube which are provided with numerals on their circumference and allow shifting of the piston only by setting them at a predetermined code. The rings are provided in their upper halves with annular recesses supporting two pairs of pins 8 integral with, and protruding out of the piston wall, which are longitudinally slidable in slots 9 in the tube wall. The rings are also vertically slotted through lips 17 in two points 18 corresponding to the position of the pins 8, permitting their downward movement and that of the piston, whenever the rings are positioned in the correct code position. The rings 14 and 15 are held in their proper position by the lower rim of the cover 16 and by a clip ring 13 firmly fastened to the tubular casing 5. Release of the locking device from the two levers is carried out by opening the lock, i.e. turning the rings 14 and 15 into the unlocking position, and pulling the piston down by means of the ring 10. As described above the clip 13 keeps these rings in their position close to the cover 16, and the mechanism is now free to be moved in a suitable manner to remove the device from engagement with the two levers 2 and 3.

It will be understood that the present locking device is much superior to the existing devices, owing to the fact that it is suitable for locking the gearshift lever and the handbrake lever in every suitable position, but in order to prevent moving of the gearshift lever, the latter should be placed in its foremost position which, with automatic gear, locks the gear as well as the engine, and engages the reverse gear with hand operation.

Figure 7:
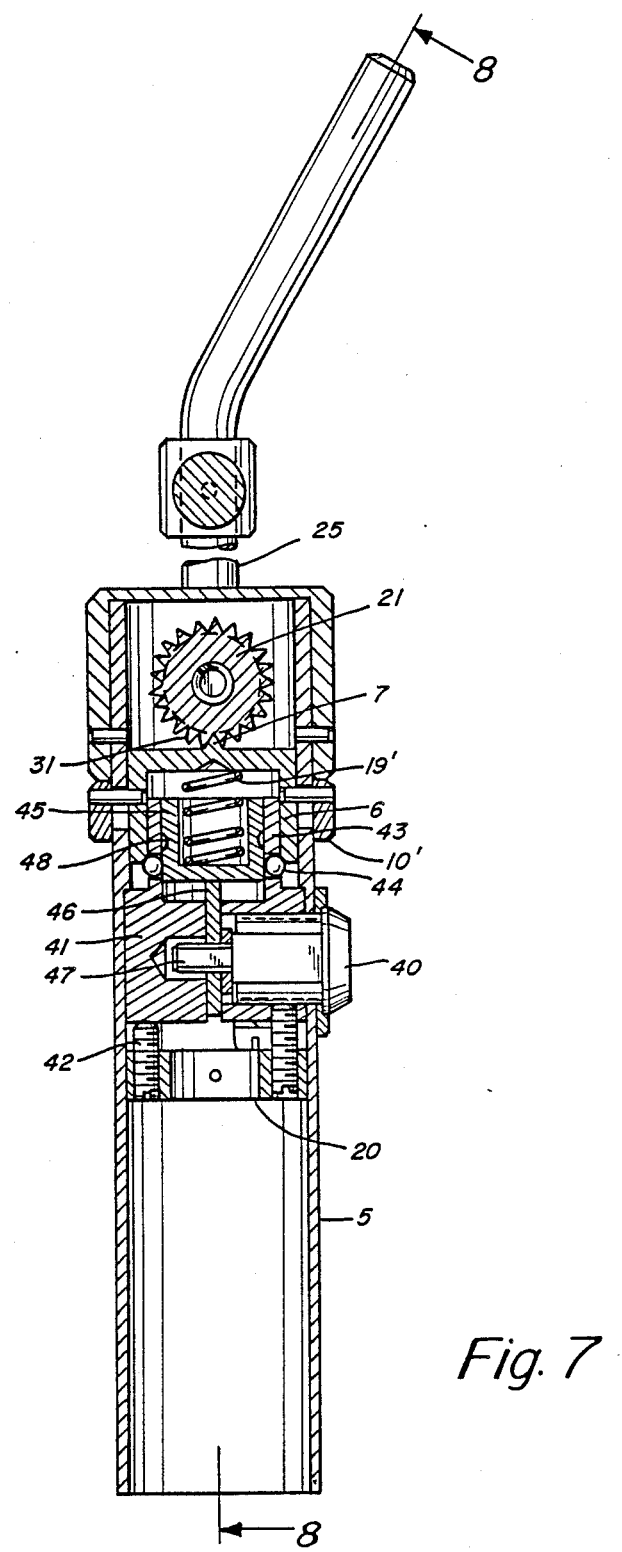
Figure 8:
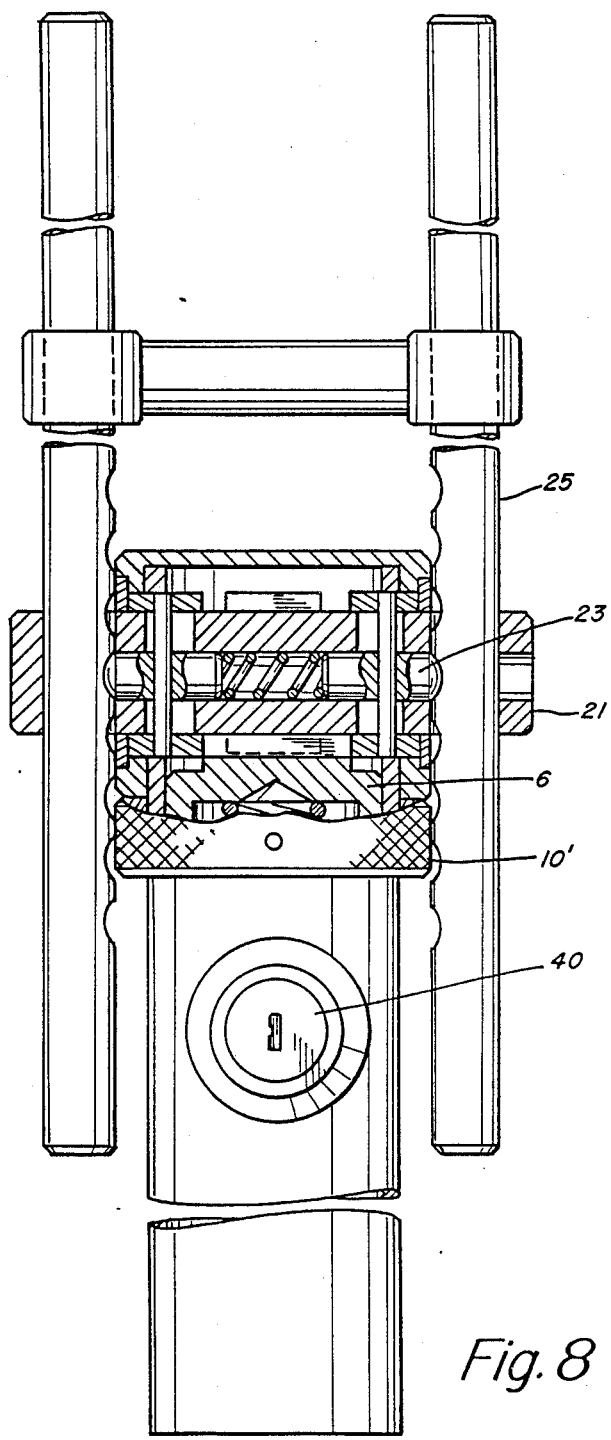

The locking device illustrated in FIGS. 5 through 8 is in almost all particulars identical with that shown and described in the foregoing, with the difference that locking of the piston in its top position is made by a cylinder lock 40 instead by means of the rings 14 and 15. For this reason those elements which are identical in both embodiments have not been indicated by numerals in these figures, but only those which are connected with the operation by means of the cylinder lock. As can be clearly seen in FIG. 7, the lock is held in position in the tube 5 by a housing 41 which in its part is secured to the tube by two screws 42 extending through the annular base 20. The top portion of the housing 41 is extended in the form of a cylinder 43 slidingly fitting into the piston 6 and provided in its wall with two bores each containing a steel ball 44. A cup-shaped body 45 is lengthwise movable in the cylinder, and a helical spring 19' is placed into the bottom of the cup urging the piston 6 in upward direction. An eccentric disc 46 is mounted on the shaft 47 of the lock 40 and is adapted to push the cup 45 upwards along the cylinder 43 whenever the lock 40 is turned. This upward movement locks the piston 6 in tooth-engaging position as shown in FIG. 7, by means of the two steel balls 44. These balls normally rest in a circumferential groove 48 recessed in the cup and evidently do not protrude out of the surface of the cylinder 43. However, as soon as the cup 45 is moved, the balls are driven out of the groove 48 and project outwardly thereby engaging the lower rim of the piston 6 and preventing its downward movement by any force. As soon as the lock 40 is opened the disc 46 releases the cup 45 which is pressed to the bottom of the cylinder 43 whereby the steel balls 44 enter the groove 48 and permit downwardly movement of the piston 6. By manually shifting the ring 10' and the piston 6 connected thereto, the tooth 7 is diengaged from the teeth of the axle 21 and the pins 23 (see FIG. 8) can be pushed inwardly by movement of the bars 25. Consequently the bifurcated member can be both turned and extended or shortened as the case may be.

Both embodiments fulfill the same purpose, but the number lock appears to be safer in that it is very difficult to break the code, while it may be easier to find a key for the cylinder lock.

I claim:

1. An anti-theft device for motor vehicles of the kind having a gearshift lever and a handbrake lever mounted on the floor substantially in line with each other, comprising:
   a tubular member having a lower open end to be fitted over said handbrake lever and an upper end containing a horizontal axle rotatably mounted therein,
   a bi-furcated member for engaging said gearshift lever and comprising two parallel bars slidingly movable in perforations in the two ends of said axle, said bars being interconnected by at least one cross member,
   first locking means for preventing rotational movement of said axle, and
   second locking means for preventing sliding movement of said bars of said bi-furcated member in said perforations in said axle.

2. The anti-theft device of claim 1 including a piston movable inside said tubular member urged in an upward direction by spring means, as well as manually by a ring connected to said piston and movable along the outside of said tubular member, said piston serving to prevent both the rotational movement of said axle and the sliding movement of said bi-furcated member, while in its uppermost position in said tubular member.

3. The anti-theft device of claim 2, wherein said first locking means includes a plurality of teeth extending outwardly from the central portion of said axle, and at least one tooth provided in the upper end of said piston adapted to engage, in its uppermost position, a space between two teeth on said axle, and hand-operated locking means serving to secure said piston in said uppermost axle-locking position.

4. The anti-theft device of claim 2, wherein said second locking means includes spaced recesses in the opposite surfaces of said two parallel bars and two plungers movable along a central bore in said axle urged into said recesses by spring means positioned in said bore between said plungers, and shoulders at the top of said piston serving to secure said two pins in recess-engaging position.

5. The anti-theft device of claim 2 wherein said piston is secured in its uppermost position by means of a hand-operated lock, permitting its downward motion against the force of said spring means, whenever said lock is opened.

6. The anti-theft device of claim 5 wherein said lock is a cylinder lock.

7. The anti-theft device of claim 5 wherein said lock is a number-lock comprising at least one ring rotatably mounted on the outside of said tubular member and provided with numerals on its circumference.

* * * * *